United States Patent
Shirane et al.

(10) Patent No.: US 6,603,631 B1
(45) Date of Patent: Aug. 5, 2003

(54) RECORDING/REPRODUCING APPARATUS HAVING CONTROLLER DETERMINING HEAD MOVEMENT OVER SUCCESSIVE DATA TRACKS AND METHOD OF USE

(75) Inventors: Kyoichi Shirane, Kanagawa (JP); Akira Mitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/245,035

(22) Filed: Feb. 4, 1999

(30) Foreign Application Priority Data

Feb. 13, 1998 (JP) .......................... P10-031815

(51) Int. Cl.[7] .............................. G11B 5/596
(52) U.S. Cl. ................................. 360/78.08
(58) Field of Search ...................... 360/78.06, 78.07, 360/78.08, 78.09, 78.14, 77.04, 77.05, 77.03, 78.11

(56) References Cited

U.S. PATENT DOCUMENTS

| | | | | |
|---|---|---|---|---|
| 3,946,876 A | * | 3/1976 | Jay | ......................... 360/78.07 |
| 4,591,933 A | * | 5/1986 | Quackenbush | ........... 360/78.07 |
| 4,700,244 A | * | 10/1987 | Fasen et al. | ............. 360/77.05 |
| 5,233,486 A | * | 8/1993 | Albert | ..................... 360/77.04 |
| 5,309,418 A | * | 5/1994 | Suzuki | ..................... 369/44.28 |
| 5,694,265 A | * | 12/1997 | Kosugi et al. | ........... 360/77.05 |

OTHER PUBLICATIONS

U.S. patent application Ser. No. 09/267,312, filed Mar. 12, 1999.

* cited by examiner

*Primary Examiner*—David Hudspeth
*Assistant Examiner*—Mitchell Slavitt
(74) *Attorney, Agent, or Firm*—Oblon, Spivak, McClelland, Maier & Neustadt, PC

(57) ABSTRACT

In a recording/reproducing apparatus, the controller has a function of increasing a count of incoming head move request pulses by one each time a head move request pulse is supplied while decreasing the count by one each time the magnetic head is moved over one data track by the magnetic head drive to provide a present count, and control the magnetic head drive to move the magnetic head at a speed based on the present count to a desired data track. Also, the magnetic head can also be moved over successive data tracks to a desired data track with a high accuracy.

8 Claims, 14 Drawing Sheets

| PERSENT POSITION | 0 | 1 | 2 | 3 | 4 | 5 | --------- | 37 | 38 | 39 |
|---|---|---|---|---|---|---|---|---|---|---|
| EXPECTED SPEED | 4 | 4 | 3 | 3 | 2 | 2 | --------- | 1 | 0 | 0 |

| COUNT CHANGE | SELECTED MODE | CONTROL IN SELECTED MODE |
|---|---|---|
| FORM 0 TO 1 | 0 | "MOVE OVER SINGLE TRACK" WITH CONTROL OF MOVE START |
| FROM 2 TO 1 | 1 | "MOVE OVER SINGLE TRACK" WITHOUT CONTROL OF MOVE START |
| SUBSEQUENT CHANGES | 2 | MOVE OVER TRACK AT PERDETERMINED SPEED (2.4 msec/TRACK) |

FIG.16

RECORDING/REPRODUCING APPARATUS HAVING CONTROLLER DETERMINING HEAD MOVEMENT OVER SUCCESSIVE DATA TRACKS AND METHOD OF USE

BACKGROUND OF THE INVENTION

1. Field of the Invention

The present invention relates to a recording/reproducing apparatus for, and method of, recording/reproducing information signal by a write/read head into and from a recording medium having a plurality of data tracks.

2. Description of Related Art

Widely used conventional recording media such as flexible disc (will be referred to as "disc" hereinunder) are those having, when formatted, a recording capacity of about 1.44 Megabytes (will be referred to as "small capacity disc" hereinunder). Such small capacity discs are played in conventional recording/reproducing apparatuses (will be referred to simply as "disc drive" hereinunder) which are adapted to spin the disc at a speed of about 300 to 600 rpm for reading/writing information signal (will be referred to as "small capacity disc drive" hereinunder).

The conventional small capacity disc drive comprises a magnetic head which is moved to a desired data track on a disc by a head moving means driven by a stepping motor. More particularly, the magnetic head is stepwise moved onto each desired data track radially of the disc by the stepping motor and information signal to write or read information signal n into or from the data track. The small capacity disc drive detects the position of a data track on which the magnetic head is positioned, from a number of pulses supplied to the stepping motor or an angle of rotation of the stepping motor.

On the other hand, there have been proposed discs having tracks formed narrower for a larger recording capacity and thus having a recording capacity as large as 150 to 650 Megabytes (will be referred to as "large capacity disc" hereinunder). For playing such large capacity discs, there have been proposed disc drives adapted to spin the disc at a speed of about 1,200 to 3,600 rpm for writing/reading information signal into and from the disc and thus attain an improved recording density and transfer rate (will be referred to as "large-capacity disc drive" hereinunder).

Such a large-capacity disc stores positional information indicative of the position of each data track. The large-capacity disc drive detects the positional information to position a magnetic head thereof onto each desired data track. The Applicant of the present invention has proposed to use a voice coil motor as linear motor for moving the magnetic head steplessly radially of the disc to a desired data track on the disc.

The above large-capacity disc drive is also adapted to detect a positional information stored in the large capacity disc and apply tracking servo control for positioning the magnetic head onto a desired data track to write or read information signal into or from the disc.

For writing or reading information signal into or from a disc, the magnetic head is moved to a desired data track over other data tracks. To move to an adjoining data track, for example, the magnetic head is moved over a single data track. For moving to a desired data track over a plurality of data tracks, the move over single data track is repeated until the magnetic head arrives at the desired data track.

The magnetic head is moved over data tracks according to an external head move request signal or similar. Therefore, for moving the magnetic head over a plurality of data tracks to a desired data track, it is necessary in some cases to detect a plurality of external head move request signals coming correspondingly to the plurality of data tracks over which the magnetic is to be moved.

In this case, when a stepping motor is used to move the magnetic head over the data tracks, it is possible to complete the head move over the data tracks within a predetermined time even if the move over single data track is repeatedly done for the number of data tracks up to a desired data track. When a voice coil motor is used to move the magnetic head over the data tracks, however, the repetition of the move over single data track for the number of data tracks cannot complete the head move over the data tracks within a predetermined time as the case may be. When the magnetic head is moved by a voice coil motor to a desired data track on a small capacity disc, for example, since the disc has no positional information stored therein, it is necessary to confirm each of data track positions over which the magnetic head is being moved, possibly causing it impossible to complete the head move to the desired data track within a predetermined time.

Recently, a disc drive compatible with both the small capacity disc widely used and large capacity disc has been developed. However, when a disc drive having a magnetic head drive formed from the above-mentioned voice coil motor is used to play (write or read information signal into or from) both a large capacity disc and a small capacity disc, a problem will arise in some cases that the magnetic head cannot be moved to a desired data track on the small capacity disc within a predetermined time.

Also, some discs have no positional information stored therein, such as the above-mentioned small capacity ones. In this case, when a voice coil motor is used to move the magnetic head to a destination over data tracks, the present position of the magnetic head cannot be confirmed so that it is difficult to completely move the magnetic head to the desired data track within a predetermined time. When disc drive having the above voice coil motor as magnetic head drive is used to write or read information signal into or from each of a large capacity disc and small capacity disc, there will take place in some cases a problem that it is difficult to move the magnetic head to a desired data track on the small capacity disc.

SUMMARY OF THE INVENTION

Accordingly, the present invention has a primary object to overcome the above drawbacks of the prior art by providing a recording/reproducing apparatus and method adapted to positively move a write/read head to a desired data track over a single data track as well as over successive data tracks on a recording medium.

The present invention has a secondary object to overcome the above drawbacks of the prior art by providing a recording/reproducing apparatus and method adapted for use with a recording medium having no positional information stored therein, as well, and to move a write/read head with a high accuracy to a desired data track over a plurality of data tracks formed on such a recording medium.

The above object can be attained by providing a recording/reproducing apparatus comprising, according to the present invention:

a write/read head to write/read information signal with respect to a recording medium having a plurality of generally parallel data tracks formed thereon;

means for driving the write/read head in a direction perpendicular to the plurality of data tracks over the data tracks on the recording medium; and means for controlling the head driving means according to a head move request signal to move the head to a desired data track;

the controlling means counting up a count of incoming head move request signals each time one head move request signal is supplied while counting down the count each time the write/read head is moved over one data track by the head driving means to provide a present count; and the head driving means moving the head at a speed based on the present count.

The above object can also be achieved by providing a recording/reproducing apparatus comprising, according to the present invention:

a write/read head to write/read information signal with respect to a recording medium having a plurality of generally parallel data tracks formed thereon;

means for driving the write/read head in a direction perpendicular to the plurality of data tracks over the data tracks on the recording medium; and means for controlling the head driving means according to a head move request signal to move the head to a desired data track;

the controlling means subtracting, from a count a of incoming head move request signals, a count b of data tracks over which the head is moved by the head driving means to provide a resulting count c=a−b; and the driving means moving the head at a speed based on the resulting count c.

The above object can also be attained by providing a recording/reproducing method in which a write/read head to write/read information signal with respect to a recording medium is moved to a desired data track on a recording medium according to a head move request signal, comprising, according to the present invention, the steps of:

counting up a count of incoming head move request signals each time one head move request signal is supplied while counting down the count each time the write/read head is moved over one data track by the head driving means to provide a present count; and moving the head at a speed based on the present count.

The above object can also be attained by providing a recording/reproducing method in which a write/read head to write/read information signal with respect to a recording medium is moved to a desired data track on a recording medium according to a head move request signal, comprising, according to the present invention, the steps of:

subtracting, from a count a of incoming head move request signals, a count b of data tracks over which the head is moved by the head driving means to provide a resulting count c=a−b; and moving the head at a speed based on the resulting count c.

The above object can also be attained by providing a recording/reproducing apparatus comprising, according to the present invention:

a write/read head to write/read information signal with respect to a recording medium having a plurality of generally parallel data tracks formed thereon;

means for driving the write/read head in a direction perpendicular to the plurality of data tracks over the data tracks on the recording medium;

means for controlling the head driving means according to a head move request signal to move the head to a desired data track;

means for detecting a position of the head between two adjoining data tracks; and means for controlling the moving speed of the head according to a speed information corresponding to the head position detected by the detecting means;

the head moving speed controlling means controlling the moving speed of the head to move the head to the desired data track.

The above object can also be attained by providing a recording/reproducing apparatus comprising, according to the present invention:

a write/read head to write/read information signal with respect to a recording medium having a plurality of generally parallel data tracks formed thereon;

means for driving the write/read head in a direction perpendicular to the plurality of data tracks over the data tracks on the recording medium;

means for controlling the head driving means according to a head move request signal to move the head to a desired data track;

means for detecting a moving speed of the head; and means for controlling the moving speed of the head according to a result of comparison between a head speed detected by the head moving speed detecting means and a preset speed profile;

the head moving speed controlling means controlling the moving speed of the head to move the head to the desired data track.

These objects and other objects, features and advantages of the present intention will become more apparent from the following detailed description of the preferred embodiment of the present invention when taken in conjunction with the accompanying drawings.

BRIEF DESCRIPTION OF THE DRAWINGS

FIG. 16 shows changes of present count of magnetic head move request pulses and corresponding modes of magnetic head move in the recording/reproducing apparatus;

DETAILED DESCRIPTION OF THE PREFERRED EMBODIMENTS

The present invention will be described below concerning an embodiment of recording/reproducing apparatus (will be referred to as "disc drive" hereinunder) adapted to compatible with both a recording medium such as flexible disc (will be referred to as either "magnetic disc" or "disc" hereinunder) having, when formatted, a recording capacity of about 1.44 Megabytes (will be referred to as "small capacity disc" hereinunder), and a recording medium having tracks formed narrower for a larger recording capacity and thus having a recording capacity as large as 150 to 650 Megabytes (will be referred to as "large capacity disc" hereinunder). The disc drive is adapted to spin the small capacity disc at a speed of about 300 to 600 rpm and the large capacity disc at a speed of 1,200 to 3,600 rpm, for reading/writing information signal. Note that in a context in the following description where both the small and large capacity discs are concerned, they will be referred to simply as "magnetic disc".

Figure 1:
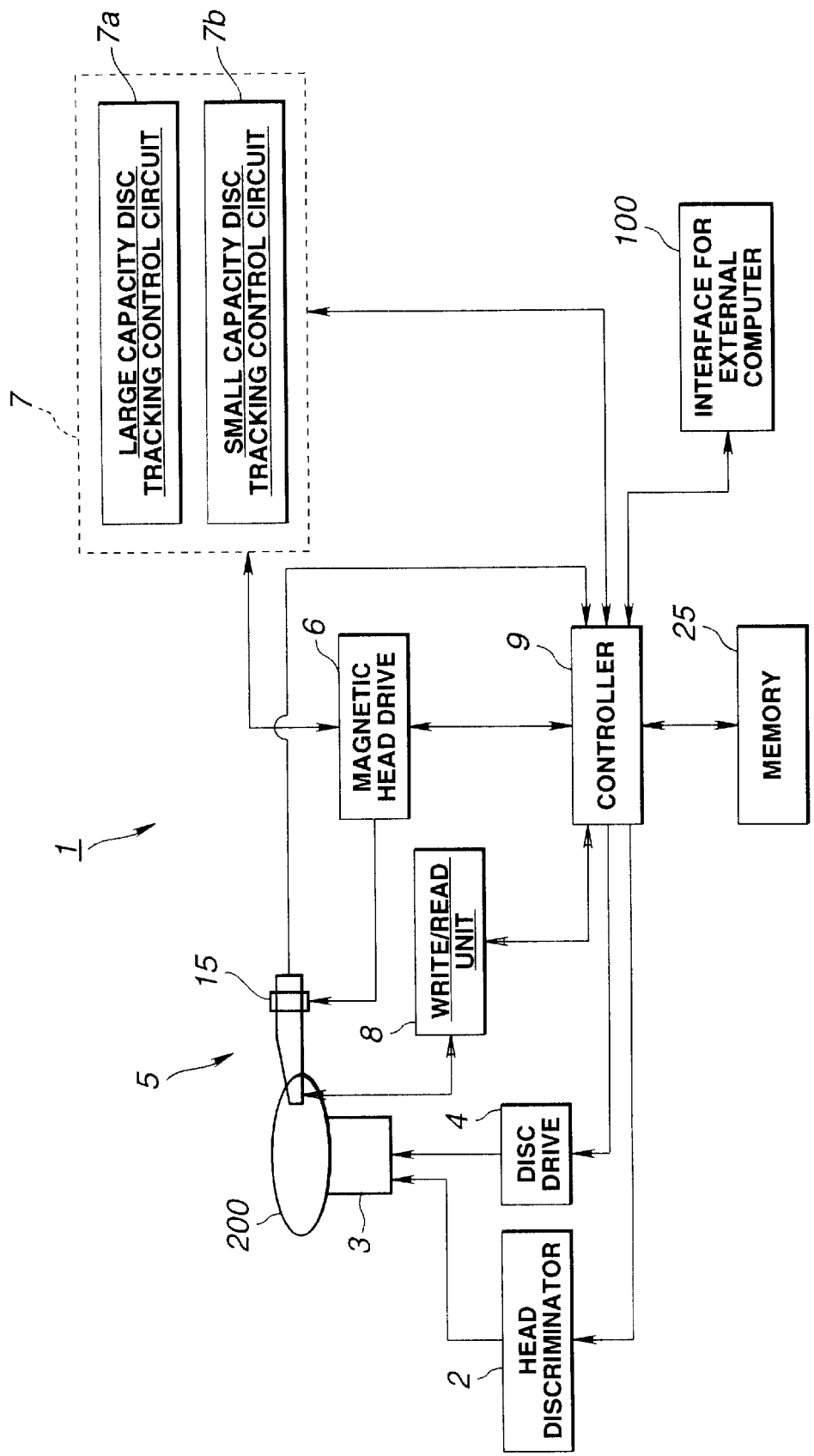
FIG. 1 is a schematic block diagram of an embodiment of the recording/reproducing apparatus according to the present invention.
Figure 2:
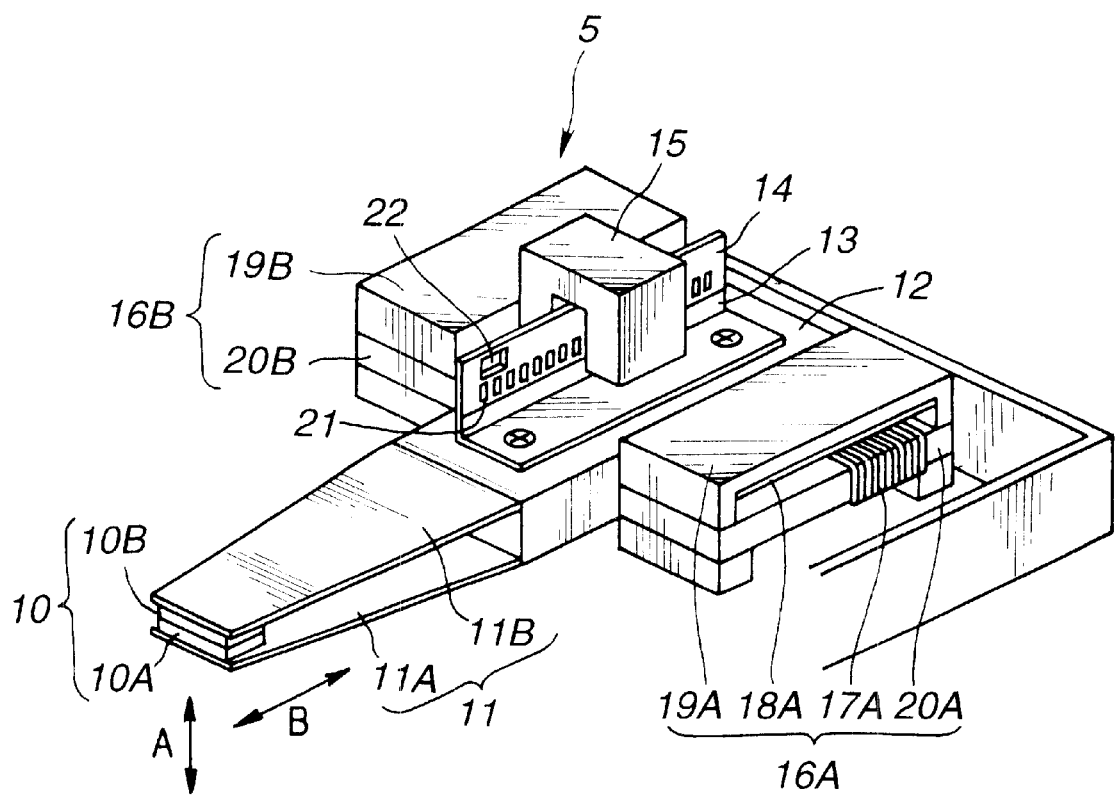
FIG. 2 is a perspective view of a magnetic head of the recording/reproducing apparatus shown in FIG. 1.

Referring now to FIGS. 1 and 2, there are illustrated a disc drive and magnetic head, respectively. The disc drive is generally indicated with a reference 1. It comprises a magnetic head 10 (see FIG. 2) to write/read information signal with respect to a magnetic disc 200 having a plurality of generally parallel and concentric data tracks, a magnetic head drive 6 to move the magnetic head 10 in a direction perpendicular to the plurality of data tracks, namely, radially of the magnetic disc 200, and a controller 9 having a function of controlling the magnetic head drive 6 according to a head move request pulse to move the magnetic head 10 to a desired data track on the magnetic disc 200.

In the disc drive 1, the function of magnetic head move control of the controller 9 is used to count up a count of head move request pulses each time one head move request pulse is supplied while counting down the count each time the magnetic head is moved over one data track by the magnetic head drive 6 to provide a present count, and control the magnetic head drive 6 to move the magnetic head 10 over tracks at a speed based on the present count.

The disc drive 1 further comprises, as shown in FIG. 1, as disc holder 3 to rotatably support the magnetic disc 200, a disc drive 4 for the magnetic disc 200, a magnetic head unit 5 to position the magnetic head 10 onto a desired data track on the magnetic disc 200, a tracking controller 7 to control the magnetic head positioning mechanism 5 for tracking in relation to the magnetic disc 200, a write/read unit 8 controlled by the magnetic head unit 5 to make write/read with respect to the magnetic disc 200, a head discriminator 2 to control the disc holder 3 according to the type of the magnetic disc 200 supported by the disc holder 3, a memory 25 having a variety of data including speed profiles, etc. stored therein, and an interface 100 for connection of an external computer (not shown).

Each blocks and circuits of this disc drive 1 will further be discussed herebelow.

The disc holder 3 is formed from, for example, a spindle motor, etc. and rotatably supports a freely removable magnetic disc 200. The disc holder 3 is connected to the disc discriminator 2 which produces a drive signal corresponding to the type of the magnetic disc 200 set in the disc holder 3. Thus, the disc holder 3 spins the magnetic disc 200 according to the drive signal.

The disc drive 4 provides the disc holder 3 with a drive signal to spin the magnetic disc 200 set in the disc holder 3. The disc holder 3 is connected to the disc discriminator 2 which provides a spin control signal for the type of the magnetic disc 200 set in the disc holder 3. The spinning of the magnetic disc 200 is controlled according to the spin control signal from the disc discriminator 2. More particularly, the disc discriminator 2 discriminates, based on a control signal supplied from the controller 9, which the magnetic disc 200 set in the disc holder 3 is a small capacity one or large capacity one, and the spin speed of the disc holder 3 is controlled according to a spin control signal for the type of the magnetic disc 2 in the disc holder 3.

More particularly, when the disc discriminator 2 decides that the magnetic disc 200 set in the disc holder 3 is a small capacity one, it generates a spin control signal according to which the magnetic disc 200 is spun at a speed for small capacity disc. When the disc discriminator 2 decides that the magnetic disc 200 set in the disc holder 3 is a large capacity one, it generates a spin control according to which the magnetic disc 200 is spun at a speed for large capacity disc. Namely, when the disc discriminator 2 decides that a large capacity disc is set in the disc holder 3, the large capacity disc is driven to spin at a higher speed than that for small capacity disc.

As will be seen from FIG. 2, the magnetic head 5 comprises magnetic head moving blocks 16A and 16B forming together the magnetic head drive 6, a head carriage 12 driven by the moving block 16A radially of the magnetic disc 200, a gauge holder 13 mounted on the head carriage 12, a track gauge 14 mounted on the head carriage 12 with the gauge holder 13 placed between them, an optical encoder 15 fixed on a fixture (not shown), an arm 11 consisting of arm pieces 11A and 11B whose bases are supported on the head carriage 12, and the magnetic head 10 consisting of head pieces 10A and 10B installed to the free ends of the arm pieces 11A and 11B to write/read information signal with respect to the magnetic disc 200.

Each of the head pieces 10A and 10B have a gap (not shown) for write/read of information signal with respect to a small capacity disc and another gap (also not shown) for write/read of information signal with respect to a large capacity disc. For write into the magnetic disc 200, the magnetic head 10 is supplied with a write signal from the write/read unit 8 and writes information signal into the magnetic disc 200, small or large capacity disc. For read of information signal from the magnetic disc 200, the magnetic head 10 supplies the write/read unit 8 with a read signal based on the information signal.

Each of the arm pieces 11A and 11B of the arm 11 has the general form of a thin plate and installed to the head carriage 12. Thus, the arm pieces 11A and 11B are moved by the head carriage 12 in the direction of bidirectional arrow A, namely, towards and away from the signal recording surface of the magnetic disc 200. The arm pieces 11A and 11B support the magnetic head pieces 10A and 10B, respectively, and are installed to the head carriage 12 in such a manner that each of the head pieces 10A and 10B is applied with a predetermined force which causes the head pieces 10A and 10B to move towards or away from the magnetic disc 200. That is, for write/read with respect to a small capacity disc, the head pieces 10A and 10B are forced towards, and thus put into contact with, the disc. For write/read with respect to a large capacity disc, however, the head pieces 10A and 10B are forced away from the disc.

The magnetic head moving blocks 16A and 16B are formed each from a voice coil motor being a so-called linear motor. More particularly, the head moving block 16A consists of a voice coil motor 17A, magnet 18A and a yoke 19A, while the head moving block 16B consists of a voice coil motor 17B, magnet 18B and a yoke 19B (it should be noted that the voice coil motor 17B and magnet 18B are not seen in the drawing). The head moving blocks 16A and 16B form together the magnetic head drive 6 to drive the magnetic head 10. More particularly, in the head moving block 16A, the yokes 19A and 20A are fixed to a chassis o the disc drive, for example, and the magnet 18A is installed to the yoke 19A. Also in the head moving block 16A, the yoke 20A is movably penetrated through the voice coil motor 17A. The magnet 18A is installed to the inner wall of the yoke 19A opposite to the yoke 20A. In the head moving block 16A, when the voice coil motor 17A is applied with a voltage, it is driven in relation to the yoke 20A. The voice coil motor 17A of the head moving block 16A is installed to the lateral side of the head carriage 12. The head moving block 16B opposite to the head moving block 16A across the head carriage 12 is similar in construction to the head moving block 16A.

In these head moving blocks 16A and 16B, when the voice coil motor 20 is applied with a voltage, it is driven to drive or move the head carriage 12 in the radial direction B of the magnetic disc 200. That is, the head moving blocks 16A and 16B move the arm pieces 11A and 11B and the magnetic head 10 provided at the free ends of the arm pieces 11A and 11B are thus moved radially (in the direction B) of the magnetic disc 200.

More particularly, the head moving blocks 16A and 16B are supplied and driven with a head drive signal and tracking signal from the controller 9 and tracking control unit 7, respectively. According to the head drive signal from the controller 9, the moving blocks 16A and 16B drive the magnetic head 10 radially (in the direction B) of the magnetic disc 200. Also, according to the tracking signal from the tracking control unit 7, the head moving blocks 16A and 16B drive the magnetic head 10 radially (in the direction B) of the magnetic disc 200 and maintain the magnetic head 10 on a desired data track. Note that the head moving blocks 16A and 16B move the magnetic head 10 over data tracks according to a head move request signal delivered from the external computer.

The track gauge 14 has the general form of a thin plate and mounted on the head carriage 12 with the gauge holder 13 placed between them as previously described. The track gauge 14 is disposed on the head carriage 12 to be parallel to the radial direction B of the magnetic disc 200.

Figure 3A:
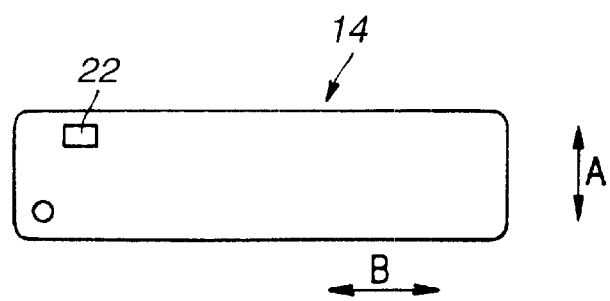
FIG. 3(A) is a side elevation of an example of track gauge provided in the recording/reproducing apparatus.
Figure 3B:
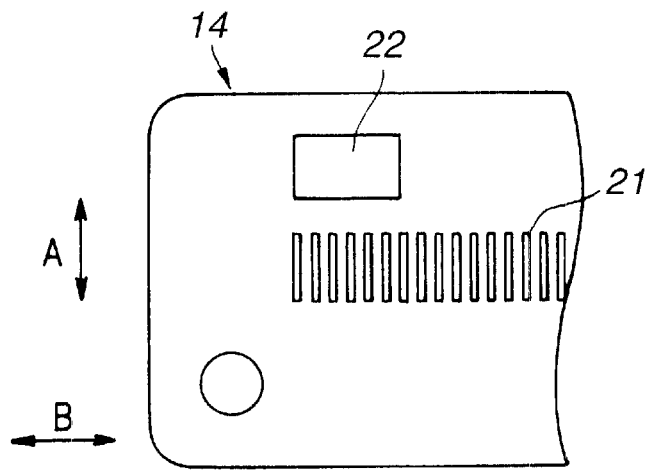
FIG. 3(B) is a side elevation of the track gauge in FIG. 3(A) enlarged in scale, having first and second openings formed therein.

As shown in FIGS. 2, 3(A) and 3(B), the track gauge 14 has formed therein a first opening consisting of slits 21 and oriented in the radial direction B of the magnetic disc 200 (the first opening will also be referred to with the reference "21" suffixed thereto anywhere in the following description) and a second opening 22 located near the magnetic disc 200.

Figure 4:
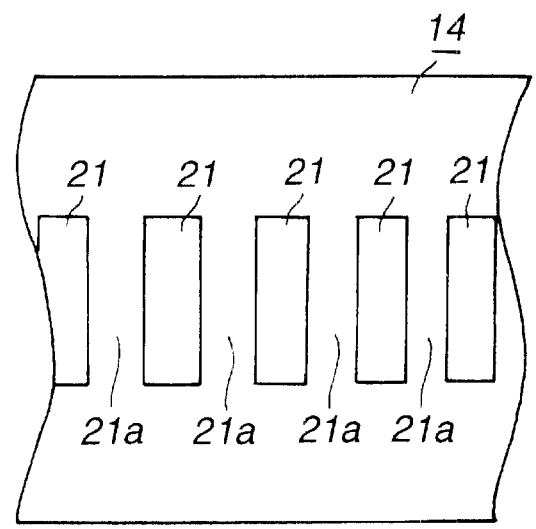
FIG. 4 is a fragmentary plan view of the track gauge, showing the first opening consisting of a plurality of slits.

As shown in FIG. 4, all of the slits 21included in the first opening have a generally same form. The slits 21 are formed in the track gauge 14 regularly at a pitch equal to the track pitch of the small capacity disc. The area 21a between two successive slits 21 blocks or intercepts the light from a light source 23 as will be described later. The first opening 21 formed in the track gauge 14 in the radial direction B of the magnetic disc 200 occupies a somewhat wider area than the width of the data track area formed on the magnetic disc 200.

The second opening 22 is provided near and flush with the disc-side end of the first opening 21. More particularly, the second opening 22 is formed in the track gauge 14 in such a manner that when the head carriage 12 is moved and the magnetic head 10 comes onto the outermost data track in the data track area of the magnetic disc 200, the second opening 22 enters into the optical encoder 15. Namely, the second opening 22 is provided to acquire information indicating that the magnetic head 10 is positioned on the outermost data track.

Since the track gauge 14 is installed on the head carriage 12, it is moved along with the head carriage 12 radially (in the direction B) of the magnetic disc 200 according to the head drive signal from the controller 9 and tracking signal from the tracking control unit 7.

Figure 5:
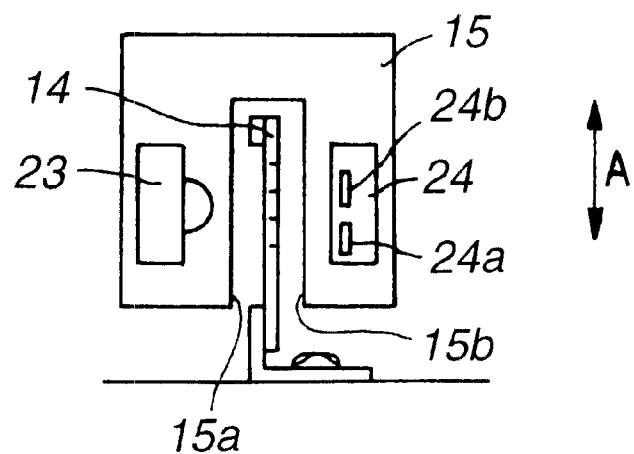
FIG. 5 is a front view of an optical encoder provided in the recording/reproducing apparatus.

As shown in FIG. 5, the optical encoder 15 comprises the light source 23 and a photodetector 24 provided across the track gauge 14 and opposite to each other. The optical encoder 15 is fixed on a fixture (not shown). Namely, the track gauge 14 is movable in relation to this optical encoder 15.

The light source 23 is a light emitting diode (LED), for example, and it is disposed on an inner wall 15a of the optical encoder 15. The photodetector 24 is a phototransistor, for example, and it is disposed on an inner wall 15b of the optical encoder 15 opposite to the inner wall 15a. Thus, a light emitted from the light source 23 disposed at one side of the track gauge 14 inside the optical encoder 15 is passed through the first and second openings 21 and 22 in the track gauge 14 and detected by the photodetector 24 provided at the other side of the track gauge 14.

Figure 6:
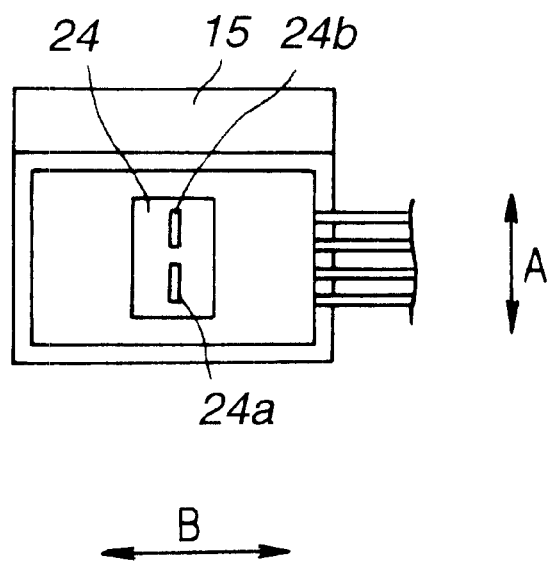
FIG. 6 is a side elevation of the optical encoder in FIG. 5, view from inner wall 15b in FIG. 5.

As shown in FIGS. 5 and 6, the photodetector 24 comprises a first phototransistor 24a located in a position where it can receive a light emitted from the light source 23 and having passed through the first opening 21, and a second phototransistor 24b located in a position where it can receive a light emitted from the light source 23 and having passed through the second opening 22.

The optical encoder 15 having the above-mentioned construction produces an optical signal of a sine wave from the light emitted from the light source 23 and having passed through the track gauge 14 when the head carriage 12 moves radially (in the direction B) of the magnetic disc 200, for example.

When the head carriage 12 moves, namely, when the track gauge 14 is moved in relation to the optical encoder 15, the light from the light source 23 is detected by the photodetector 24 as will be discussed below.

When the head carriage 12 is moved, a light emitted from the light source 23 is detected by the photodetector 24. That is, the head moving blocks 16A and 16B are driven according to the head drive signal supplied from the controller 9, whereby the head carriage 12 is also driven. As the magnetic head 10 and track gauge 14 are moved radially (in the direction B) of the magnetic disc 200, the optical encoder 15 detects, by means of the photodetector 24, a light from the light source 23 while the track gauge 14 is being moved.

While the track gauge 14 is being moved, the slits 21 and light blocking area 21a shown in FIG. 4 alternately pass by between the light source 23 and photodetector 24. Thus, the first phototransistor 24a detects the resulting intensity of the light emitted from the light source 23 and having passed through the slit 21 and been blocked by the light blocking area 21a to generate a first optical signal $S_a$ of a generally sine wave as shown in FIG. 7.

Figure 7:
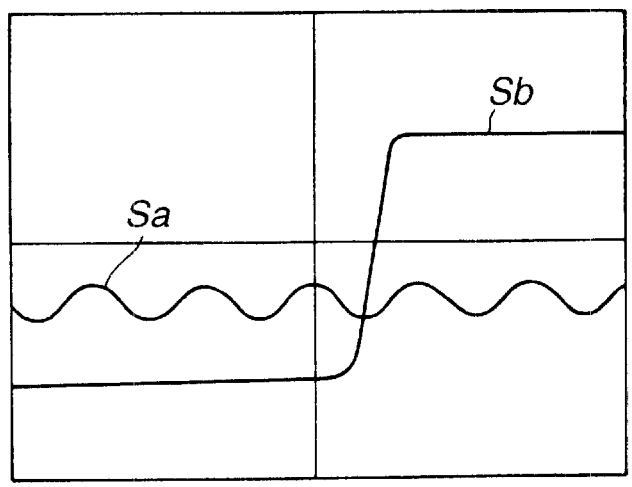
FIG. 7 graphically illustrates changes of first and second optical signals generated when the magnetic head of the recording/reproducing apparatus is moved from the inner to outer circumference.

When the magnetic head 10 is moved radially of the magnetic disc 200 and thus the second opening 22 in the track gauge 14 passes before the second phototransistor 24b, the latter will generate an optical signal $S_b$ varying like a generally stepwise wave as shown in FIG. 7. The leading edge of the step-like wave of this second optical signal $S_b$ indicates when the magnetic head 10 is positioned on the outermost data track inside the data track area of the magnetic disc 200.

Thus, a data track on the outermost circumference of the data track area can be sought based on the second optical signal $S_b$, whereby each data track in the data tack area on the magnetic disc 200 can be sought based on the first optical signal $S_a$.

Positional information for each data track on the small capacity disc is generated based on each of these optical signals. More particularly, based on the first optical signal $S_a$, top and bottom values, shown in FIG. 8, of the sine wave are stored into the memory 25 at each period of the sine wave signal. The memory 25 has two memory areas for the top and bottom values, respectively. Top and bottom values are sequentially recorded into these memory areas, respectively, correspondingly to each data track. These top and bottom values are used to know the position of the magnetic head 10 within the data track area and that of the magnetic head between the data tracks when the magnetic head 10 is moved over data tracks.

According to this embodiment of the present invention, the zero-cross point of the first optical signal $S_a$ is taken as center of data track and a period from the zero-cross point is taken as track pitch. Thus, the top and bottom values correspond to one data track.

The position of the magnetic head 10 within the data track area is determined by counting the top and bottom values of the first optical signal $S_a$ from the optical encoder 15 to know a data track No. on which the magnetic head 10 is positioned at present. The procedure for producing positional information from the top and bottom values stored in the memory 25 in the course of moving the magnetic head 10 over data tracks will be discussed later.

The optical signals are produced only when a small capacity disc is used in the disc drive because the disc has no positional information indicating the positions of data tracks.

When the magnetic head 10 arrives at a desired data track based on the positional information, the disc drive 1 starts maintaining the magnetic head 10 on the data track. This tracking operation is done under the control of the tracking control unit 7.

As shown in FIG. 1, the tracking control unit 7 comprises a large-capacity disc tracking control circuit 7a for maintaining the magnetic head 10 on a desired data track on a large capacity disc set in the disc holder 3, and a small-capacity control circuit 7b for maintaining the magnetic head 10 on a desired data track on a small capacity disc set in the disc holder 3.

The large-capacity disc tracking control circuit 7a control the tracking of a large capacity disc based on tracking signals, etc. previously recorded on data tracks on a large capacity disc. For example, a tracking signal is recorded on a data track on a large capacity disc and the large-capacity disc tracking control circuit 7a maintains the magnetic head 10 on a desired data track according to this tracking signal.

Figure 9:
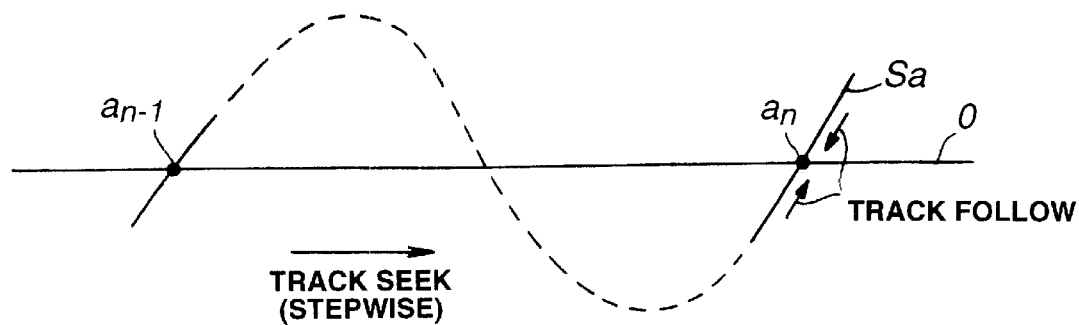
FIG. 9 explains a track follow effected by the recording/reproducing apparatus according to the first optical signal.

As shown in FIG. 9, the small capacity disc tracking control circuit 7b controls the tracking of a small capacity disc on a desired data track according to the first optical signal $S_a$ produced as the magnetic head 10 is moved and a reference line O set to intersect the first optical signal $S_a$. Zero-cross points . . . , $a_{n-1}$, $a_n$, . . . at which the first optical signal $S_a$ intersects with the reference line O at every period correspond to the centers of data tracks on a small capacity disc.

More particularly, when the magnetic head 10 has moved to a desired data track, namely, when it has arrives at a zero-cross point, as mentioned above, corresponding to the desired data track, the small capacity disc control circuit 7b controls the magnetic head 10 for maintaining the latter on the zero-cross point (this tracking operation will be referred to as "track follow" hereinunder).

The controller 9 delivers control signals to the disc drive 4, write/read unit 8, magnetic head drive 6 and tracking control unit 7, respectively, to control these components of the disc drive 1. The memory 25 is connected to this controller 9 as shown in FIG. 1.

When a magnetic disc 200 is set, for example, the controller 9 will provide control signals to the disc drive 4, magnetic head drive 6 and tracking control unit 7, respectively. The disc discriminator 2 will produce, based on the control signal supplied from the controller, a spin control signal to apply the disc holder to the magnetic disc 200.

When the magnetic disc 200 is set in the disc holder 3, the disc drive 4 will drive the disc holder 3 according to the control signal supplied from the controller 9. The tracking control unit 7 enables either its large-capacity disc tracking control circuit 7a or small capacity disc tracking control circuit 7b according to the control signal supplied from the controller 9 to produce a tracking signal. When supplied with the control signal from the controller 9, the write/read unit 8 will change the data transfer rate and others depending upon which the magnetic disc 200 is a large or small capacity disc and have the magnetic head 10 write or read information signal into or from the magnetic disc 200.

The controller 9 has connected thereto the external computer interface 100 which connects with an external computer (not shown) and conveys a control signal or others delivered from the external computer to the controller 9. For write/read operation, for example, a head move request pulse delivered from the external computer is conveyed to the controller 9.

The disc drive 1 constructed as having been described in the foregoing will function with a small capacity disc set in the disc drive 1 as will be described below:

More particularly, the function of the disc drive 1 will be described concerning a move of the magnetic head 10 move over data tracks according to a head move request pulse delivered from the external computer. The magnetic head 10 is moved over a single data track and also over successive data tracks. First, the disc drive 1 will be functionally described concerning the move over single data track, and then the move over successive data tracks.

In the disc drive 1, when a small capacity disc is set in the disc holder 3, the head carriage 12 is driven to move the magnetic head 10 towards the inner circumference of the disc once and then towards the outer circumference of the disc.

When the head carriage 12 is driven to move the magnetic head 10 towards the outer circumference of the disc, the first optical signal $S_a$ is only pulled in as shown in FIG. 7. In the disc drive 1, top and bottom values of the first optical signal $S_a$ thus pulled in are stored in a predetermined memory area of the memory 25. The top and bottom values are related to each data track and stored into the memory area.

Then, the disc drive 1 will wait until a head move request pulse arrives from the external computer. When the controller 9 detects when a head move request pulse has arrived via the external computer interface 100 from the external computer, the controller 9 will provide a control signal corresponding to the head move request pulse to the magnetic head drive 6.

First the operation of the disc drive for a move over a single data track will be described herebelow. In this case, the magnetic head 10 is moved towards the outer circumference of a small capacity disc.

Figure 10:
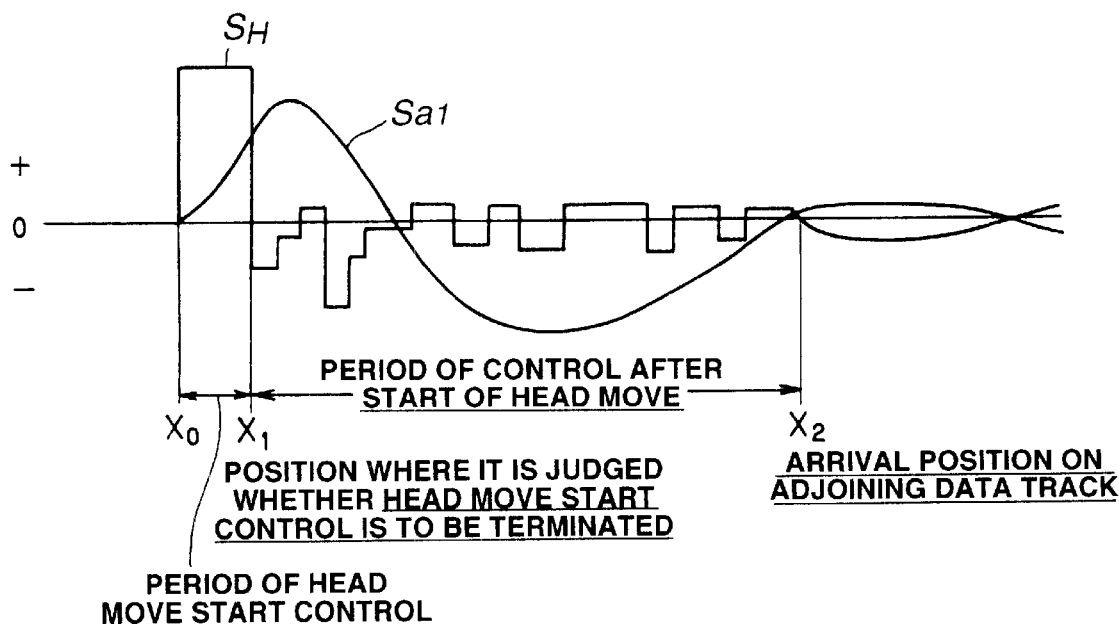
FIG. 10 shows hysteresis of a head drive signal and first optical signal when the magnetic head is moved to an adjoining data track with the moving speed of the magnetic head controlled according to the first optical signal from the optical encoder.

As shown in FIG. 10, the controller 9 will generally provide two different modes of control: Control of move start of the magnetic head 10 in a head move start control period (from $X_0$ to $X_1$ in FIG. 10) and control of head move in a period (from $X_1$ to $X_2$ in FIG. 10) of control after the magnetic head 10 starts moving, to thereby move the magnetic head 10 from a present position to an adjoining data track.

First, the controller 9 will control the magnetic head drive 6 to unconditionally provide a head drive signal for a maximum driving force to have the magnetic head 10 start moving in a direction based on a head move request pulse delivered from the external computer via the interface 100. Namely, the magnetic head drive 6 will produce a head drive signal $S_H$ as kick pulse for a maximum driving force to have the magnetic head 10 start moving, as shown in FIG. 10.

Then, the controller 9 will control the magnetic head drive 6 holding the head drive signal $S_H$ until the magnetic head 10 arrives at a desired position ($X_1$). It should be noted that the head drive signal $S_H$ for applying a maximum driving force is held until the magnetic head 10 moves over a predetermined distance necessary and sufficient for the magnetic head 10 to arrives at the adjoining data track. That is to say, the controller 9 will allow the magnetic head drive 6 to start driving the magnetic head 10 unconditionally with no speed control so that the magnetic head 10 is moved to a desired position between a starting data track and a desired data track with a predetermined driving force in the period of control after the magnetic head 10 starts moving. Thus, the magnetic head 10 is moved to the desired position at a predetermined initial speed.

At this time, when the head drive signal $S_H$ has a positive value, it will yield a driving force to move the magnetic head 10 towards the outer circumference of the disc (forward driving). On the other hand, when the head drive signal $S_H$ has a negative value, it will yield a driving force to move the magnetic head 10 towards the inner circumference of the disc (reverse driving). When the magnetic head 10 is moved towards the outer circumference of the disc as in this case, a change of the head drive signal $S_H$ to a positive value represents an acceleration of the magnetic head 10, while a change to a negative value indicates a deceleration of the magnetic head 10.

When the magnetic head 10 is thus moved, the optical encoder 15 will produce a first optical signal $S_{a1}$ (a change of the head drive signal $S_H$ after the position $X_0$) indicating that the magnetic head 10 is moved. In the period of control after start of head move following the period of head move start control, the controller 9 will control the moving speed of the magnetic head 10 according to the first optical signal $S_{a1}$ supplied from the optical encoder 15. Namely, in the period of control after start of head move, the controller 9 will lower the peak value of the kick pulse for application of the maximum driving force and then provide a servo control of the moving speed of the magnetic head 10 based on the first optical signal $S_{a1}$. Further, the controller 9 will control the moving speed of the magnetic head 10 while monitoring the position of the magnetic head at every predetermined time in the period of control after start of head move.

For this monitoring of the position of the magnetic head 10 and controlling of the head speed by the controller 9, the predetermined time is 0.24 msec, for example.

More particularly, the moving speed of the magnetic head 10 in the period of control after start of head move is controlled based on a comparison between a preset speed profile and actual moving speed of the magnetic head 10.

Figures 11, 12:
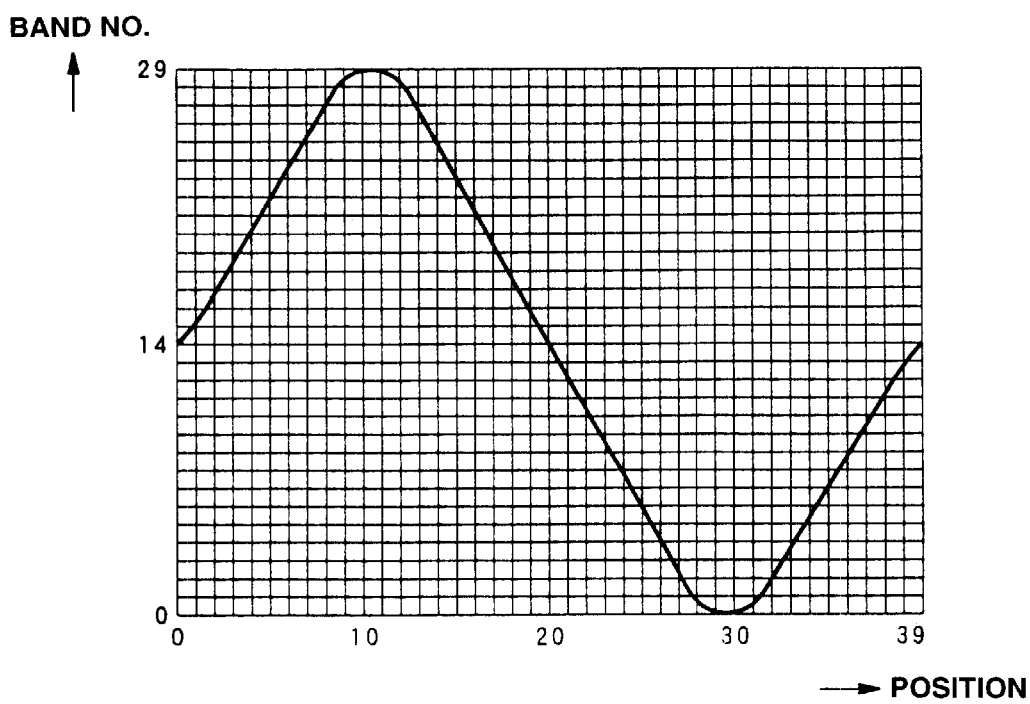
FIG. 11 is a table showing a speed profile used to control the moving speed of the magnetic head which is moved over data tracks.
FIG. 12 is a table showing positional information obtained based on the optical signal top and bottom values stored in the memory and normalized to be a sine wave signal.

The speed profile is delineated based on a so-called expected speed table including present positions and expected speeds corresponding to the present positions as shown in FIG. 11. The present position is a present position where the magnetic head 10 presently stays between a starting data track and a desired data track. The expected speed is a so-called ideal speed of the magnetic head 10 at the present position. Therefore, if the magnetic head 10 at the present position corresponding to the expected speed has the expected speed, the speed is necessary and sufficient one for the magnetic head 10 to arrive at the destination adjoining data track. The speed profile is stored in the memory 25, for example. Assume that a distance between data tracks is divided by 40 to provide positions "0" to "40" as will be discussed later. The kick pulse peak is lowered at a position "8" between the positions "0" to "39" and thereafter the moving speed of the magnetic head 10 is servo-controlled based on the first optical signal $S_{a1}$.

Then, the controller 9 will, referring to the speed profile, control the moving speed of the magnetic head 10 so that the magnetic head 10 will have the expected speed when standing at the present position. Namely, the controller 9 will select, referring to the speed profile, an ideal moving speed for the magnetic head 10 at the present position and thus control the magnetic head 10 to move at the selected speed.

More particularly, the controller 9 will determine, from a positional information table, the present position of the magnetic head 10 between a starting data track to a desired data track, and control the moving speed of the magnetic head 10 referring to the present position determined from the positional information table and the speed profile. The positional information table is generated by reading top and bottom values corresponding to a position of the magnetic head 10 between the data tracks and generating a sine wave for one period as nonnalized waveform. That is, the sine wave signal is generated from the top and bottom values stored in the memory 25 after first pulled in. This sine wave signal will be generally same as that produced by first pulling in the first optical signal. More particularly, this waveform can be represented as a quantized table as shown in FIG. 12 in which the horizontal axis indicates magnetic head positions in data tracks while the vertical axis indicates quantized Band values. The Band value and direction of the head positions are equally divided, respectively. According to this application of the present invention, the Band value is divided to 30 subdivisions from 0 to 29 while the direction is divided to 40 subdivisions from 0 to 39. Thus, a position resulted by dividing one data track width by 40 corresponds to each Band value subdivision. As having previously been described, the zero-cross point is taken as the center of data track and the zero-cross points of one period correspond to positions of the magnetic head 10 on a starting data track and on a desired data track, respectively, in this embodiment. Namely, a positional information table shown in FIG. 12 indicates positions between data tracks.

Figure 13:
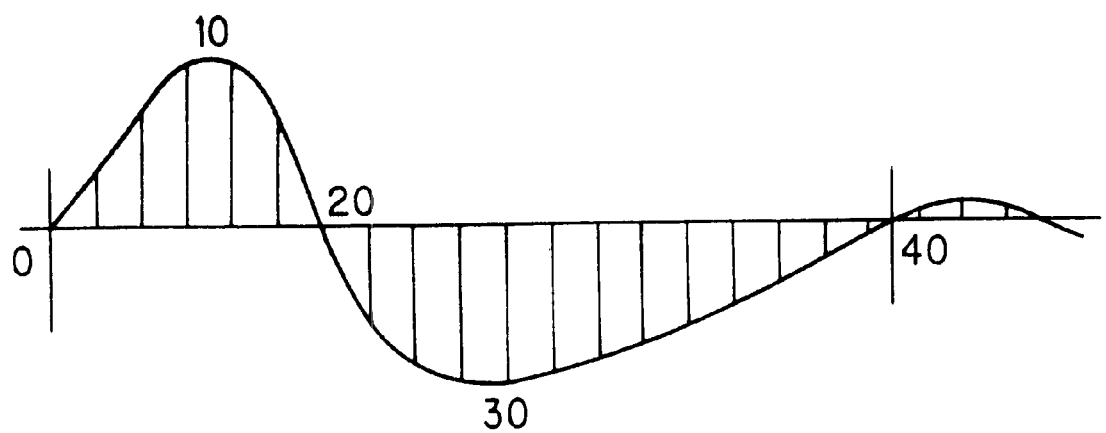
FIG. 13 shows an example of sampling of the first optical signal produced from the optical encoder.

The position of the magnetic head 10 between data tracks can be known through comparison between the band value and the value of first optical signal $S_a$ produced as the magnetic head 10 is actually moved onto a data track. As shown in FIG. 13, the first optical signal $S_a$ is monitored at every predetermined time and a position of the magnetic head 10 at a position in a data track where it stays presently is detected in the form of a voltage or similar. Thus, a first optical signal $S_a$ actually produced is converted to a digital value by a D/A converter (not shown) and compared in the positional information table shown in FIG. 12. Note that the first optical signal $S_a$ is monitored at every 0.24 msec.

Figure 8:
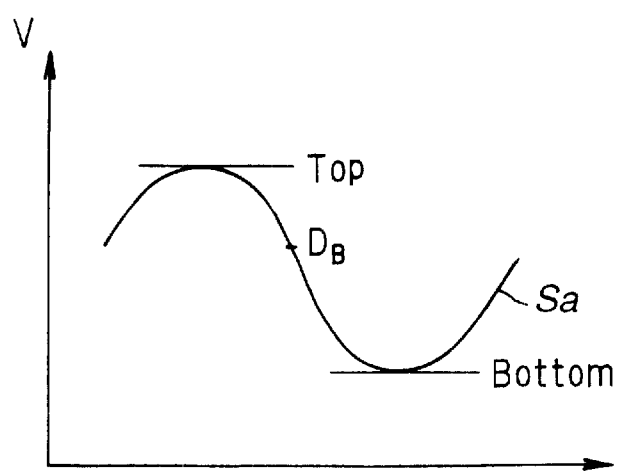
FIG. 8 graphically illustrates top and bottom values of the first optical signal stored into a memory of the recording/reproducing apparatus.

More particularly, when the first optical signal $S_a$ is converted to a digital value $D_B$ as shown in FIG. 8, a Band number is determined based on the digital value $D_B$ by calculating a following value:

Band No.=$D_B$−Bottom value/((Top value−Bottom value)/30)  (1)

Then, a position corresponding to a Band signal determined from the value (1), namely, a Band No. indicative of an actual position of the magnetic head 10, can be known referring to the positional information table already acquired and shown in FIG. 12.

Thus, the position of the magnetic head 10 between data tracks can be accurately known based on the first optical signal $S_a$ acquired as the magnetic head 10 is actually moved and the top and bottom values stored in the memory 25.

Then the controller 9 will calculate an actual moving speed of the magnetic head 10 (will be referred to as "measured speed" hereinunder) from the position determined as in the above and compare it with the expected speed included in the speed profile. The measured speed is calculated from a difference between the first optical signals $S_a$ provided from the optical encoder 15 and monitored at every predetermined time. Namely, as will be seen from FIG. 13, the first optical signal $S_a$ is monitored at every predetermined time, a position of the magnetic head 10 is detected from the positional information table as mentioned above, and thus a measured speed can be calculated by dividing the head position by the predetermined time interval. That is, the measured speed=(Head position at present time−Head position at position one time interval before)/$\Delta t$ where $\Delta t$ is the predetermined time interval for monitoring. The predetermined time interval is 0.24 msec as mentioned in the foregoing.

Figure 14:
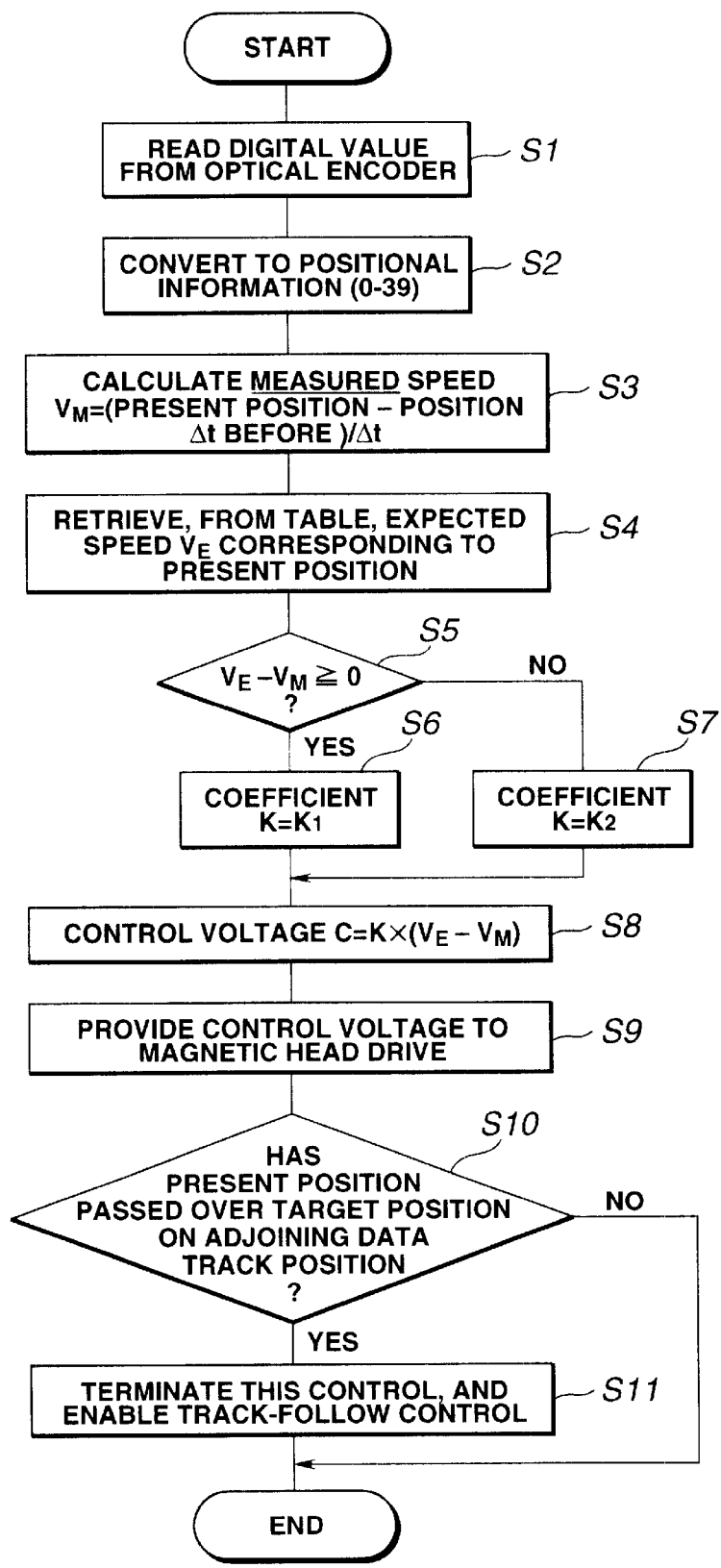
FIG. 14 is a flow chart of operations done for moving the magnetic head to an adjoining data track at a controlled moving speed.

The measured speed and expected speed are compared with each other for control the head moving speed to positively move the magnetic head 10 to an adjoining data track. The moving speed of the magnetic head 10 at each position is controlled as shown in the flow chart in FIG. 14.

First at step S1, a digital value (quantized first optical signal $S_a$) from the optical encoder 15 is read. Next at step S2, the top and bottom values are invoked from the memory 25 to produce normalized positional information (0 to 39) of a sine wave for one period.

At step S3, a measured speed is calculated. Namely, the measured speed $V_M$=(Present position−Position $\Delta t$ before)/$\Delta t$ is calculated. Further at step S4, an expected speed $V_E$ for the present position is retrieved from the table (speed profile).

At steps S5, S6 and S7, a coefficient K is selected based on a relation between the expected speed $V_E$ and measured speed $V_M$ where K is a gain, parameter for determination of the magnitude of the speed control. Thus, in this embodiment, the coefficient K is determined based on the decisions made at steps S5, S6 and S7. Therefore, the coefficient K depends upon the moving speed of the magnetic head 10.

After the coefficient K is determined, a control signal supplied from the controller 9 to the magnetic head drive 6 is calculated using a control signal C=K×($V_E$−$V_M$) at step S8. The control signal C is a signed one. Namely, when $V_E$<$V_M$ (expected speed is higher than measured speed), the control signal is a negative one. When $V_E$>$V_M$ (expected speed is higher than measured speed), the control signal C is a positive one.

The control signal C calculated at step S8 is supplied to the magnetic head drive 6 at step S9. The magnetic head drive 6 drives the magnetic head 10 according to a head drive signal based on a control signal C from the controller 9. When the control signal C is negative, namely, when the expected speed is lower than the measured speed, the magnetic head drive 6 will reverse the magnetic head 10 correspondingly to the control signal C. On the other hand, when the control, signal C is positive, namely, when the expected speed is higher than the measured speed, the magnetic head drive 6 will forward the magnetic head 10 correspondingly to the control signal C. Note that when $V_E$=$V_M$, the magnetic head drive 6 will apply no driving force to the magnetic head 10. Thus, the magnetic head 10 will be moved by the magnetic head drive 6 towards a desired data track while being smoothly decelerated.

At step S10, it is judged whether the present position of the magnetic head 10 has passed over the position of the adjoining data track. When it is decided that the present position has passed over the adjoining data track position, the control of move to the adjoining data track is terminated and the aforementioned track-follow control is effected. If the present position has not passed over the adjoining data track position, this operation is terminated.

Since the moving speed of the magnetic head 10 is controlled after the kick pulse leads the magnetic head 10 to a predetermined speed, the head drive signal $S_H$ is changed in the period of control after start of head move ($X_1$ to $X_2$) as shown in FIG. 10 in this embodiment. For example, the head drive signal $S_H$ shows a negative value more frequently than a positive value more in this embodiment, and thus the head drive signal $S_H$ provides mainly a deceleration of the magnetic head 10 in the period of control after start of head move ($X_1$ to $X_2$).

As having been described in the foregoing, the driving force to start moving the magnetic head 10 taken as kick pulse depending upon a head move request pulse is applied to the magnetic head 10 which will thus be put into motion.

Thereafter, the position and moving speed of the magnetic head 10 put into motion are monitored to appropriately control the moving speed of the magnetic head 10, thereby allowing the magnetic head 10 to arrive at a desired data track.

Then in the disc drive 1, the magnetic head 10 moved to a desired data track by the above-mentioned controlling procedure is subject to a track-follow control, by the small capacity disc tracking control circuit 7b, of the data track to which the magnetic head 10 has been moved. That is, as will be seen from FIG. 9, in the disc drive 1, the magnetic head 10 having been moved to the adjoining data track by the track seek operation will be positioned as desired in the data track by the track-follow control. The small capacity disc tracking control circuit 7b is inactive while the magnetic head 10 is being moved as in the above.

The position and moving speed (measured speed) are not detected between data tracks only for th head move over a single data track. Also in a head move over successive data tracks which will be discussed layer, the present position is detected and the moving speed at the present position is detected as in the above procedure.

Figure 15:
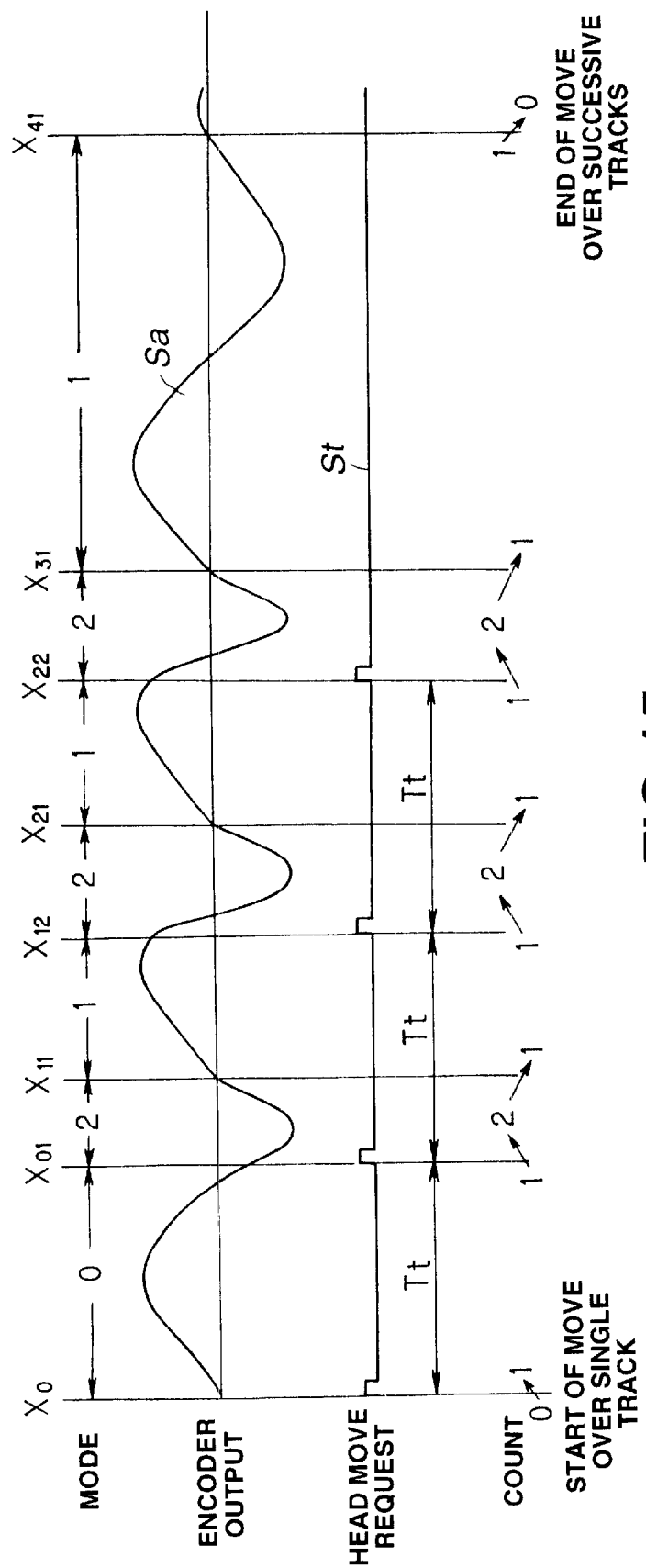
FIG. 15 shows selection of mode of magnetic head move control by the recording/reproducing apparatus upon reception of successive magnetic head move request pulses.

The magnetic head 10 is moved over successive data tracks as will be discussed herebelow. A request for head move over successive data tracks is send from the external computer to the controller at each time of head move request $T_r$ as shown in FIG. 15. In response to this request signal, the controller 9 will provide a head move over successive data tracks. More particularly, the controller 9 has a plurality of modes of head move each including a preset speed profile, and selects any one of the modes based on a change of the present count of incoming head move request signals to move the magnetic head 10 in the selected mode.

The present count is increased each time a head move request arrives from the external computer, and decreased each time the magnetic head 10 is moved over one data track. Namely, it is a result of subtraction of one from a count of incoming head move requests each time the magnetic head 10 has completely been moved over one data track. It is a count with the magnetic head 10 being at the present position. In the embodiment of disc drive 1, when a head move request supplied from the external computer is detected (the count is increased by one), and when the magnetic head 10 has completely been moved over one data track (the count is decreased by one), the present count changes so that the mode of head move is changed from one to another correspondingly.

The controller 9 monitors the output of the optical encoder 15 at every predetermined time interval, and changes the mode of head move from one to another at the predetermined time interval. In this embodiment, the monitoring time is 0.24 msec.

More particularly, each mode of head move is based on a speed profile including positions of the magnetic head 10 on different data tracks and speeds corresponding to the positions. The moving speed of the magnetic head 10 is controlled following the speed profile so that the magnetic head 10 moves at a selected speed from a position where the magnetic head 10 presently is.

As shown in FIG. 16, the modes of head move are in three kinds: Move over a single track with control of start of moving the magnetic head 10 (will be referred to as "mode 0" hereinunder), move over a single track without control of start of moving the magnetic head 10 (will be referred to as "mode 1"), and move over a track of the magnetic head 10 at a predetermined speed (will be referred to as "mode 2").

In the mode 0, the magnetic head 10 is moved over a single data track as shown in FIG. 10. The magnetic head 10 is put into motion with a kick pulse, and the magnetic head 10 once thus started is moved at a controlled speed with reference to the expected speed table as shown in FIG. 11. This mode 0 is started when a first request for head move is supplied.

In the mode 1, the magnetic head 10 is put into motion with no kick pulse. It is moved at a controlled speed with reference to an expected speed table including same expected speeds. Namely, the mode 1 is a mode 0 that is lack of the control of move start.

In the mode 2, the magnetic head 10 is moved with reference to an expected speed table including same expected speeds. The controlled speed for this mode 2 is higher than the maximum repetition rate (3 msec/track) of head move request pulse. Thus, even when a head move request pulse is supplied at a rate not exceeding the maximum repetition rate, the magnetic head 10 can be moved smoothly over successive data tracks.

Figure 17A:
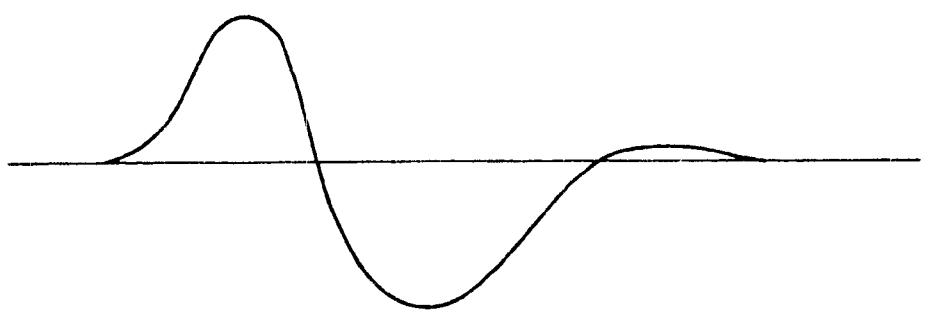
FIGS. 17A, 17B and 17C shows speed curves produced when magnetic head move is controlled in each of the modes of magnetic head move.
Figure 17B:
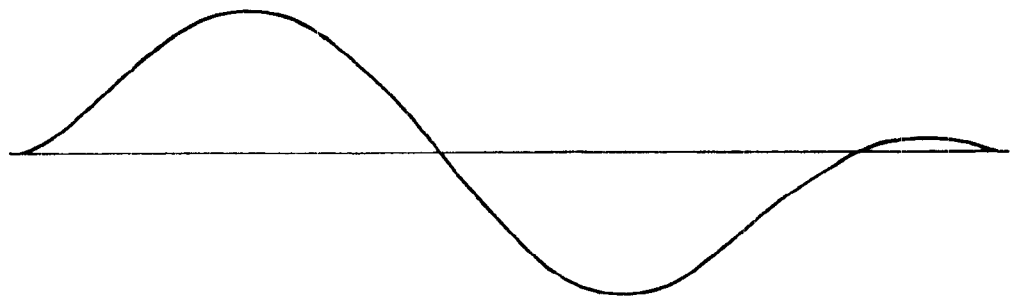
Figure 17C:
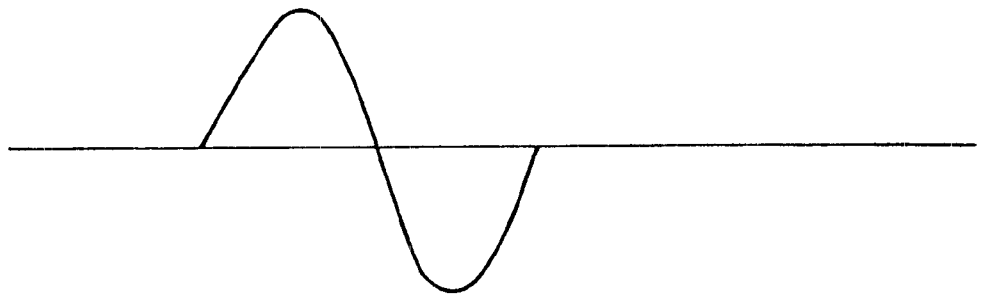

FIG. 17 shows outputs from the optical encoder 15 when the above modes of head move are executed, namely, the curves of speeds at which the magnetic head 10 is moved. FIG. 17(A) shows a curve of a speed at which the magnetic head 10 is moved in the mode 0, FIG. 17(B) shows the curve of a speed at which the magnetic head 10 is moved in the mode 1, and FIG. 17(C) shows the curve of a speed at which the magnetic head 10 is moved in the mode 2. The controller 9 puts into run each of these modes of head move referring to an expected speed table including present positions and expected speeds meeting the speed curve for each mode.

Figure 18:
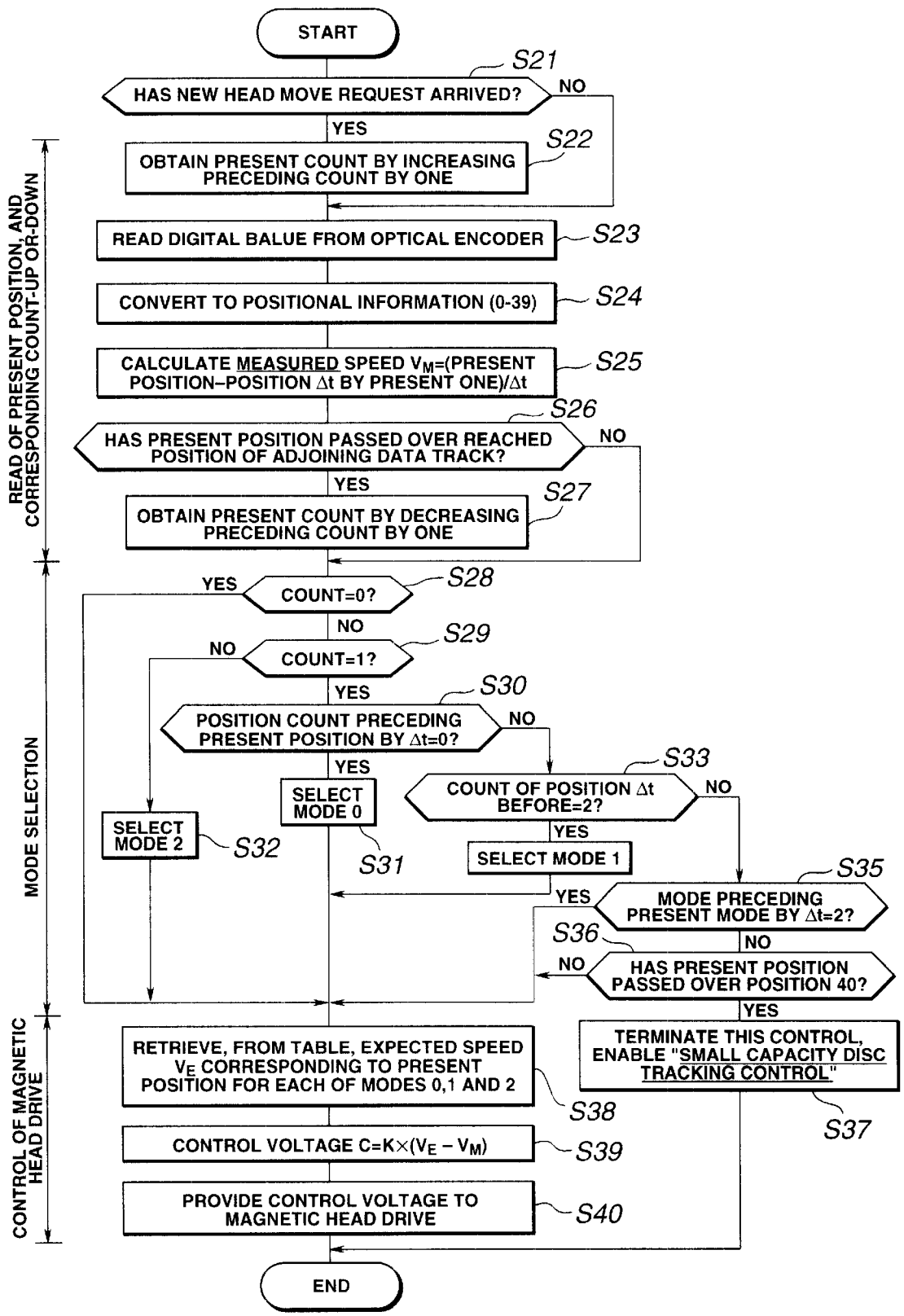
FIG. 18 is a flow chart of operations done for changing the mode of magnetic head move from one to another according to a change of the present count.

FIG. 18 is a flow chart of operations done for changing the mode of magnetic head move from one to another according to a change of the present count. Referring to this drawing, selection of a mode of head move according to a change of the count of incoming head move request pulses, and control of the moving speed of the magnetic head 10 in the selected mode of head move, will be discussed herebelow. It is assumed here that the request for head move over successive data tracks is supplied successively from the external computer at constant time intervals of request for head move as having been described with reference to FIG. 15.

At step S21, the controller 9 judges whether a head move request pulse (head move request) has arrived. When it is decided that such a request pulse has arrived, the controller 9 goes to step S22. At step S22, the controller 9 increments the preceding count, that is, a count Δt before to provide a present count, and goes to step S23. At this step, the controller 9 reads a digital value from the optical encoder 15 (a digital value of the first optical signal $S_a$). When it is decided that such a pulse has not arrived, the controller 9 jumps over step S22 and goes to step S23 at which the controller 9 will read the digital value from the optical encoder 15.

At next step S24, the controller 9 converts top and bottom values stored in the memory 25 and corresponding to the position of the magnetic head 10 to a positional information to generate the positional information table. At next step S25, the controller 9 will calculate a measured speed $V_M$= (Present position)−(position Δt before). That is, the steps S23 to S25 are identical to the steps S1 to S3 having been described with reference to FIG. 14.

Thereafter, at step S26, the controller 9 will judge whether the present position of the magnetic head 10 has passed over a target position on the adjoining data track, namely, the center of the adjoining data track. More particularly, it is judged whether the first optical signal $S_a$ has passed over a zero-cross point corresponding to the data track center. When it is decided that the present position of the magnetic head 10 has passed over the target position on the adjoining data track, the controller 9 goes to step S27 where it will decrement the present count. Then, the controller goes to step S28. If it is decided that the present position has not passed over the target position on the adjoining data track, the controller 9 will jump over step S27 and go to step S28.

At step S28, the controller 9 will judge whether the present count is zero (0). When the controller 9 decides that the present count is 0, it will go to step S38. If the controller 9 decides that the present count is not 0, it will goes to next step S29.

At step S29, the controller 9 will judge whether the present count is one (1). When the controller 9 decides that the present count is 1, it will go to step S30. Alternatively, if the controller 9 decides that the present count is not 1, it will go to step S32.

At step S32, the controller 9 will select the mode 2. More particularly, when the controller 9 confirms at step S28 that the present count is not 0 and at step S29 that the present count is not 1, namely, when the controller 9 confirms that the change of the present count is neither a change from 0 to 1 nor 2 to as shown in FIG. 16, it will select the mode 2 at step S32. Then, the controller 9 will go to step S38.

On the other hand, if the controller confirms at step S29 that the present count is 1, it will judge at step S30 whether the count Δt before is 0. When the controller 0 decides that the count Δt before is 0, it will go to step S33. If the controller 9 confirms that the count Δt before is not 0, it will go to step S31.

At step S31, the controller selects the mode 0. That is to say, when the controller 9 confirms at step S29 that the present count is 1 and at step S30 that the count Δt before is 0, namely, when the controller 9 decides that the present count has changed from 1 to 0 as shown in FIG. 16, it will select the mode 0 at step S31. Then the controller 9 will go to step S38.

On the other hand, when the controller 9 decides at step S30 that the count Δt before is not 0, it will judge at step S33 whether the count Δt before is 2. When the controller 9 confirms that the count Δt before is 2, it will go to step S34. If the controller 9 decides that the count Δt before is not 2, it will go to step S35.

At step S34, the controller 9 will select the mode 1. Namely, when the controller 9 decides at step S29 that the count Δt before is 1 and at steps S30 and S33 that the count Δt before is 2, that is, that the present count has changed from 2 to 1 as shown in FIG. 16, it will select the mode 1 at step S34. Then the controller 9 will go to step S38.

If the controller 9 decides at step S33 that the count Δt before is not 2, it will judge at step S35 whether the mode of head move Δt before is the mode 2. If the controller confirms that the mode Δt before is not the mode 2, it will go to step S36. When the controller 9 decides that the mode Δt before is the mode 2, it will go to step S38.

At step S36, the controller 9 will judge whether the magnetic head 10 has passed over the position 40 (center of the adjoining data track shown in FIG. 9). If the controller 9 decides that the magnetic head 10 has passed over the position 40, it will go to step S37. When the controller 9 decides that the magnetic head 10 has not passed over the position 40, it will terminate the control of head move and enable the small capacity disc tracking control circuit 7b for track-follow control.

At step S38, the controller 9 retrieves an expected speed corresponding to the present position with reference to the expected speed table as having previously been discussed. The expected speed table is changed appropriately at steps S32, S31 and S34 when the present count is changed. In other words, the moving speed of the magnetic head 10 is controlled in a same mode of head move as the mode Δt before unless the present count is changed.

After retrieving an expected speed from the speed profile, the controller 9 goes to steps S39 at which it will calculate a control voltage $C=K\times(V_E-V_M)$. At next step S40, the controller will provide a control signal C to the magnetic head drive 6. The calculations effected at steps S39 and S40 are identical to those effected at steps S8 and S9 in FIG. 14. That is to say, the controller 9 will determine a control signal for the magnetic head drive correspondingly to a difference between an expected speed $V_E$ and measured speed $V_M$. When the expected speed $V_E$ is lower than the measured speed $V_M$, a magnetic head drive signal to decelerate the magnetic head 10 is generated. If the expected speed $V_E$ is higher than the measured speed $V_M$, a magnetic head drive signal to accelerate the magnetic head 10 is generated.

As aforementioned, the controller 9 selects one of the modes of head move at every predetermined time interval Δt and controls the moving speed of the magnetic head 10 in the selected mode of head move. Here, the control of the moving speed of the magnetic head 10 according to a change of the present count will be further discussed with reference to FIG. 15. Here it is assumed that four head move request pulses $S_t$ are successively supplied to the controller 9 at every time intervals $T_t$.

The zero-cross points taking place at each of the periods $X_0$ to $X_{11}$, $X_{11}$ to $X_{21}$, $X_{21}$ to $X_{31}$ and $X_{31}$ to $X_{41}$ of the first optical signal $S_a$ from the optical encoder 15 correspond to the center of each data track as having previously been described. For simplicity of the illustration and description, the first zero-cross point $X_0$ is taken as the center of the first data track, the second zero-cross point $X_{11}$ is taken as the center of the second data track, the third zero-cross point $X_{21}$ is taken as the center of the third data track, and the fourth zero-cross point $X_{41}$ is taken as the center of the fourth data track.

Detecting the first head move request pulse $S_t$, the controller 9 will start moving the magnetic head 10 from the center of the first data track. That is, the controller 9 detects at step S29 in FIG. 18 that the present count is 1 and at step S30 that the count Δt before is 0, and thus detects that the present count has been changed from 0 to 1. Namely, the controller 9 will detect that a request has been made for moving the magnetic head 10 standing still on the first data track to a second data track adjoining the first data track. Thus the controller 9 will select the mode 0 at step S31, and control, at step S38, the moving speed of the magnetic head 10 referring to the expected speed table for the mode 0 and allow the magnetic head 10 to start moving. Namely, the controller 9 will detect a first head move request pulse, control start of head move and allow the magnetic head 10 to start moving.

Then, the controller 9 will allow the magnetic head 10 to move to the second data track at a controlled speed for the mode 0 while monitoring the arrival of a head move request pulse and first optical signal $S_a$ at every time interval Δt (0.24 msec). In this example, when the magnetic head 10 passes by a position $X_{01}$ in the course of moving towards the second data track, namely when the time $T_t$ passes after the preceding head move request pulse has arrived, a new head move request pulse will arrive. The controller 9 will detect at step S21 that the new head move request pulse has arrived. Then, at step S22, it increments the present count up to 2. Thus, since the controller detects at steps S28 and 29 that the present count is neither 0 nor 1, it will select the mode 2 at step S32.

At step S38, the controller 9 starts controlling the moving speed of the magnetic head 10 referring to the expected speed table for the mode 2. Thus the magnetic head 2 will be moved at a constant speed. Further, monitoring the arrival of a head move request pulse and first optical signal $S_a$ at the time interval $\Delta t$, the controller 9 will allow the magnetic head 10 to be moved towards the second data track at a speed for the mode 1. Then, since the zero-cross point of the first optical signal $S_a$ supplied from the optical encoder 15 is detected, namely, since it is detected that the magnetic head 10 has been moved over one data track, the controller 19 will decrement the present count at step S27 because the magnetic head 10 has arrived at the center of the second data track. Namely, the controller 9 will decrement the present count down to 1. Thus, it is detected at step S29 that the present count is 1 and at step S33 that the count $\Delta t$ before is 2, the mode of head move is changed to the mode 1 at step S34.

At step S38, the controller 9 will start controlling the moving speed of the magnetic head 10 referring to the expected speed table for the mode 1. Here, the magnetic head 10 is moved over a single data track without being controlled on the start of head move. While monitoring the arrival of head move request pulse and first optical signal $S_a$ at the time intervals $\Delta t$, the controller 9 will allow the magnetic head 10 to move towards the third data track at a controlled speed for the mode 1. Then the controller 9 will detect a new head move request pulse at the position X01 in the course of moving towards the third data track. Namely, the controller 9 will detect the arrival of the new head move request pulse at step S21.

As at the position $X_{01}$, the controller 9 will increment the present count and select the mode 2 at step S32. Then the controller 9 will control the moving speed of the magnetic head 10 in the mode 2 until the magnetic head 10 is positioned on the center of the third data track, detect the arrival at the center (position $X_{21}$) of the second data track, namely, detect the zero-cross point, and decrement the present count.

The moving speed of the magnetic head 10 until the magnetic head 10 arrives at the center of the third data track ($X_{21}$ to $X_{31}$) is controlled by the controller 9 as in the course of the magnetic head 10 moving from the center of the second data track to that of the third data track ($X_{11}$ to $X_{21}$). Namely, the controller 9 will control the moving speed of the magnetic head 10 in te mode 1 until a next head move request pulse arrives, and in the mode 2 for a period from the arrival of the head move request pulse until the magnetic head 10 has passed by the center of the fourth data track.

Since the present count is changed from 2 to 1 when the magnetic head 10 passes by the center of the third data track, the controller 9 will control the motion of the magnetic head 10 by controlling the moving speed in the mode 1. In this example, it is assumed that head move request pulses are in 4 kinds. Namely, the fourth data track is the final target position. Therefore, when the magnetic head 10 has arrived at the fourth data track, no further head move request pulse will arrive. Thus, the controller 9 will allow the magnetic head 10 to move to the center of the fourth data track by controlling the moving speed in the mode 1 as well. When the controller 9 detects that the magnetic head 10 has passed by the center of the fourth data track, it will decrement the present count. Thus, the present count is changed from 1 to 0. Thus, at step S37, the controller 9 will enable the small capacity disc tracking control circuit 7b to position the magnetic head 10 on the center of the data track by the track-follow control.

As having been discussed in the foregoing, the disc drive 1 moves the magnetic head 10 over a single data track and also over successive data tracks.

For the head move over successive data tracks, the disc drive 1 will newly generate the mode 2 for the successively incoming head move request pulses and make a changeover between the move over a single data track (mode 1) and move over successive data tracks (mode 2), thereby permitting to smoothly and positively move the magnetic head 10 over successive data tracks even when the magnetic head 10 is driven by a voice coil motor as previously mentioned.

For positive implementing the head move over successive data tracks, the constant speed for head move over successive data tracks (mode 2) is set higher than the maximum repetition rate of head move request pulse. Thus, even if a head move request pulse arrives at any rate which does not exceed the controlled speed in the mode 2, the disc drive 1 can move the magnetic head 10 very smoothly over successive data tracks.

Also, even if the time for head move over one data track exceeds a required head move time, the disc drive 1 can completely move the magnetic head 10 within the allowable time for the head move over successive data tracks.

Figure 19:
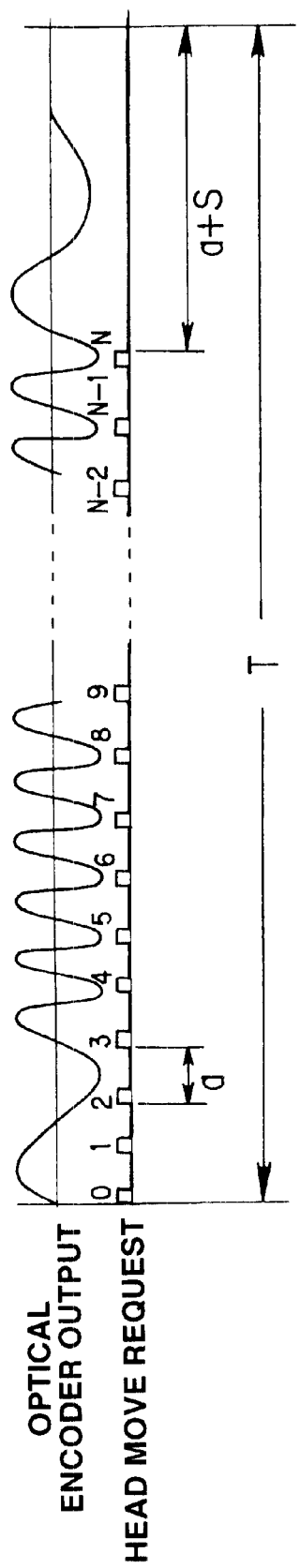
FIG. 19 is an explanatory drawing showing that the magnetic head can always be moved over successive data tracks within a time allowed for the magnetic head move over successive data tracks.

Namely, as shown in FIG. 19, a so-called settling time S is provided after a number N of successive head move request pulses delivered for a predetermined required head move time a from the external computer. Thus, the disc drive 1 is allowed to move the magnetic head 10 to the final data track within the allowable time T for head move over successive data tracks=N×a+S.

In the disc drive 1, the magnetic head 10 is moved over successive data tracks as a whole, not as individual data tracks. Therefore, even if the time for head move over data tracks exceeds the required head move time a, this difference can be accommodated by the settling time S.

In the disc drive 1 having been discussed in the foregoing, any other means may be used to make a changeover between the plurality of modes of head move and move the magnetic head 10 over successive data tracks in the selected mode referring to the expected speed table for the selected mode.

That is to say, the disc drive 1 produces a count a of incoming head move request pulses by means of the controller 9. Also the disc drive 1 produces, by means of the controller 9, a count b of data tracks over which the magnetic head 10 has been moved. The disc drive 1 makes changeover between the modes of head move based on a resulting count c=a−b obtained by subtracting the count b of data tracks from the count a of head move request pulses, and moves the magnetic head 10 over successive data tracks referring to the expected speed table for the selected mode of head move. That is, the disc drive 1 controls the moving speed of the magnetic head 10 by selecting any one of the modes of head move according to a difference between the count b of data tracks and count a of head move request pulses.

In the recording/reproducing apparatus according to the present invention, the tracking controlling means increments a count of incoming head move request signals each time a head move request signal arrives while decrementing the count each time the write/read is moved by the head driving means over one data track to produce a present count, and the write/read head is moved by the head driving means over data tracks at a speed based on the present count. Even if successive head move request signals are supplied, the head is moved over successive data tracks at a speed based on the held present count, thereby permitting to move the head to a desired data track.

Therefore, even if a head move request signal is supplied at any rate not exceeding the controlled moving speed of the head, the recording/reproduce apparatus can move the head smoothly.

Also, even if the time for moving the head over one data track exceeds the required head move time, the head can be completely moved to a target position within the allowed time for head move over successive data tracks.

In the recording/reproducing apparatus according to the present invention, the tracking controlling means subtracts a count b of data tracks over which the head has been moved by the head driving means from a count a of incoming head move request signals to provide a resulting count c=a−b, and the write/read head is moved by the head driving means over data tracks at a speed based on the resulting count c=a−b. Even if successive head move request signals are supplied, the head is moved over successive data tracks at a speed based on the held resulting count c, thereby permitting to move the head to a desired data track.

Therefore, even if a head move request signal is supplied at any rate not exceeding the controlled moving speed of the head, the recording/reproduce apparatus can move the head smoothly.

Also, even if the time for moving the head over one data track exceeds the required head move time, the head can be completely moved to a target position within the allowed time for head move over successive data tracks.

In the recording/reproducing method according to the present invention, a count of incoming head move request signals is incremented each time a head move request signal arrives while the count is decremented each time the write/ read is moved by the head driving means over one data track to produce a present count, and the write/read head is moved over data tracks at a speed based on the present count. Even if successive head move request signals are supplied, the head is moved over successive data tracks at a speed based on the held present count, thereby permitting to move the head to a desired data track.

Therefore, even if a head move request signal is supplied at any rate not exceeding the controlled moving speed of the head, the head can be moved smoothly.

Also, even if the time for moving the head over one data track exceeds the required head move time, the head can be completely moved to a target position within the allowed time for head move over successive data tracks.

In the recording/reproducing method according to the present invention, a count b of data tracks over which the head has been moved by the head driving means is subtracted from a count a of incoming head move request signals to provide a resulting count c=a−b, and the write/ read head is moved over data tracks at a speed based on the resulting count c=a−b. Even if successive head move request signals are supplied, the head is moved over successive data tracks at a speed based on the held resulting count c, thereby permitting to move the head to a desired data track.

Therefore, even if a head move request signal is supplied at any rate not exceeding the controlled moving speed of the head, the recording/reproduce apparatus can move the head smoothly.

Also, even if the time for moving the head over one data track exceeds the required head move time, the head can be completely moved to a target position within the allowed time for head move over successive data tracks.

In the recording/reproducing apparatus according to the present invention, the position detecting means detects a position of the write/read head on a data track, and the moving speed detecting means controls the actual moving speed of the head based on a moving speed corresponding to the detected position to move the head to a desired data track. Thus, when a recording medium having no positional information recorded therein is used in the apparatus, the head can be moved to a desired data track.

Further, in the recording/reproducing apparatus according to the present invention, the write/read head can be moved to a desired data track only by controlling the moving speed of the head according to a speed information corresponding to a position of the head moved between data tracks. Thus, the head can be moved to a desired data track without detecting the moving direction of the head.

Also in the recording/reproducing apparatus according to the present invention, the speed detecting means detects the moving speed of a write/read head and the moving speed controlling means controls the actual moving speed of the head based on the result of a comparison between the detected moving speed and a preset speed profile to move the head to a desired data track. Thus, when a recording medium having no positional information recorded therein is used in the apparatus, the head can be moved to a desired data track.

Furthermore, in the recording/reproducing apparatus according to the present invention, the write/read head can be moved to a desired data track based on the result of a comparison between a speed of the head being moved between data tracks. Therefore, the head can be moved to a desired data track without detecting the moving direction of the head.

What is claimed is:

1. A recording/reproducing apparatus comprising:

a write-read head to write/read information signal with respect to a recording medium having a plurality of generally parallel data tracks formed thereon;

means for driving the write/read head in a direction perpendicular to the plurality of data tracks over the data tracks on the recording medium; and means for controlling the head driving means according to a head move request signal to move the head to a desired data track;

the controlling means counting up a count of incoming head move request signals each time one head move request signal is supplied, each of the head move request signals indicating one additional data track to be moved over, while counting down the count each time the write/read head is moved over one data track by the head driving means to provide a present count; and the head driving means moving the head at a speed based on the present count;

wherein when the present count is 0 or 1 the head driving means moves the head over adjoining data tracks at a speed following preset speed profile, and when the present count is greater than 1 the head driving means moves the head at a speed higher than maximum repetition rate of the head move request signal.

2. The apparatus as set forth in claim 1, wherein the head driving means comprises:

means for supporting the head on the recording medium; and a linear motor to move the head supported by the supporting means in a direction perpendicular to the plurality of data tracks on the recording means.

3. The apparatus as set forth in claim 1, wherein the recording medium is a disc-like one having the plurality of data tracks formed concentrically thereon.

4. A recording/reproducing apparatus comprising:

a write-read head to write/read information signal with respect to a recording medium having a plurality of generally parallel data tracks formed thereon;

means for driving the write/read head in a direction perpendicular to the plurality of data tracks over the data tracks on the recording medium; and means for controlling the head driving means according to a head move request signal to move the head to a desired data track;

the controlling means subtracting, from a count a of incoming head move request signals, each of the head move request signals indicating one additional data track to be moved over, a count b of data tracks over which the head is moved by the head driving means to provide a resulting count c=a−b; and the head driving means moving the head at a speed based on the resulting count c;

wherein when the resulting count c is 0 or 1 the head driving means moves the head over adjoining data tracks at a speed following preset speed profile, and when the resulting count c is greater than 1 the head driving means moves the head at a speed higher than maximum repetition rate of the head move request signal.

5. The apparatus as set forth in claim 4, wherein the head driving means comprises:

means for supporting the head on the recording medium; and a linear motor to move the head supported by the supporting means in a direction perpendicular to the plurality of data tracks on the recording means.

6. The apparatus as set forth in claim 4, wherein the recording medium is a disc-like one having the plurality of data tracks formed concentrically thereon.

7. A recording/reproducing method in which a write/read head to write/read information signal with respect to a recording medium is moved to a desired data track on a recording medium according to a head move request signal, comprising the steps of:

counting up a count of incoming head move request signals each time one head move request signal is supplied, each of the head move request signals indicating one additional data track to be moved over, while counting down the count each time the write/read head is moved over one data track by the head driving means to provide a present count; and moving the head at a speed based on the present count;

wherein when the present count is 0 or 1 the head driving means moves the head over adjoining data tracks at a speed following preset speed profile, and when the present-count is greater than 1 the head driving means moves the head at a speed higher than maximum repetition rate of the head move request signal.

8. A recording/reproducing method in which a write/read head to write/read information signal with respect to a recording medium is moved to a desired data track on a recording medium according to a head move request signal, comprising the steps of:

subtracting, from a count a of incoming head move request signals, each of the head move request signals indicating one additional data track to be moved over, a count b of data tracks over which the head is moved by the head driving means to provide a resulting count c=a−b; and moving the head at a speed based on the resulting count c;

wherein when the resulting count c is 0 or 1 the head driving means moves the head over adjoining data tracks at a speed following preset speed profile, and when the resulting count c is greater than 1 the head driving means moves the head at a speed higher than maximum repetition rate of the head move request signal.

* * * * *

UNITED STATES PATENT AND TRADEMARK OFFICE
CERTIFICATE OF CORRECTION

PATENT NO. : 6,603,631 B1  
DATED : August 5, 2003  
INVENTOR(S) : Kyoichi Shirane et al.

It is certified that error appears in the above-identified patent and that said Letters Patent is hereby corrected as shown below:

<u>Column 5,</u>
Line 22, change "shows" to -- show --.

<u>Column 7,</u>
Line 38, change "o" to -- of --.

<u>Column 8,</u>
Line 17, change "21included" to -- 21 included --.

<u>Column 9,</u>
Line 35, change "tack" to -- track --.

<u>Column 12,</u>
Line 67, change "nonnalized" to -- normalized --.

<u>Column 15,</u>
Line 17, change "the" to -- the --.
Line 19, change "layer" to -- later --.

<u>Column 19,</u>
Line 46, change "te" to -- the --.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,603,631 B1
DATED : August 5, 2003
INVENTOR(S) : Kyoichi Shirane et al.

It is certified that error appears in the above-identified patent and that said Letters Patent is hereby corrected as shown below:

Column 15,
Line 17, change "th" to -- the --

Signed and Sealed this

Third Day of August, 2004

JON W. DUDAS
*Acting Director of the United States Patent and Trademark Office*